April 17, 1951
McDONALD D. SMITH
2,549,536
APPARATUS FOR MAKING BRUSHES
Filed April 11, 1946
7 Sheets-Sheet 1
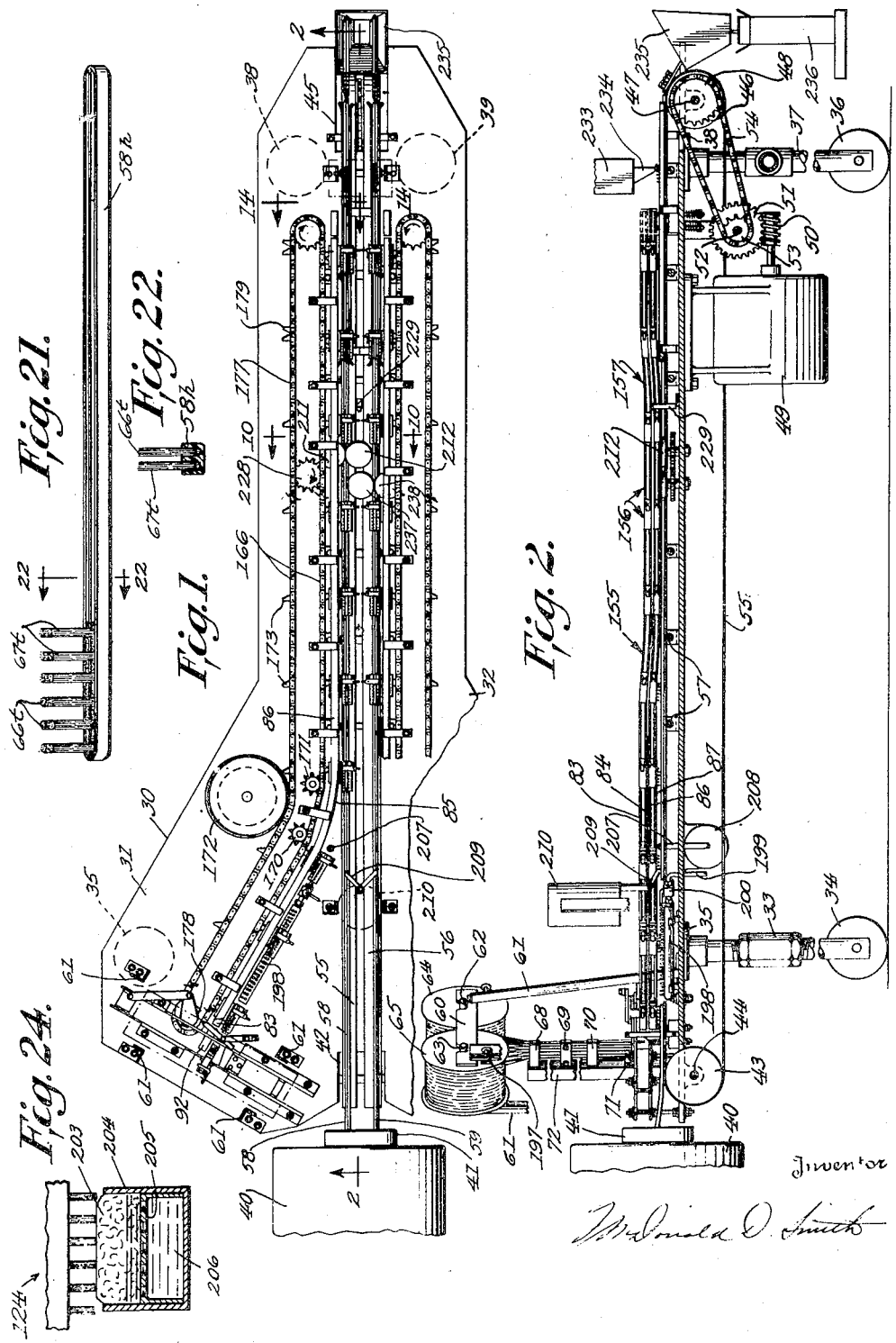

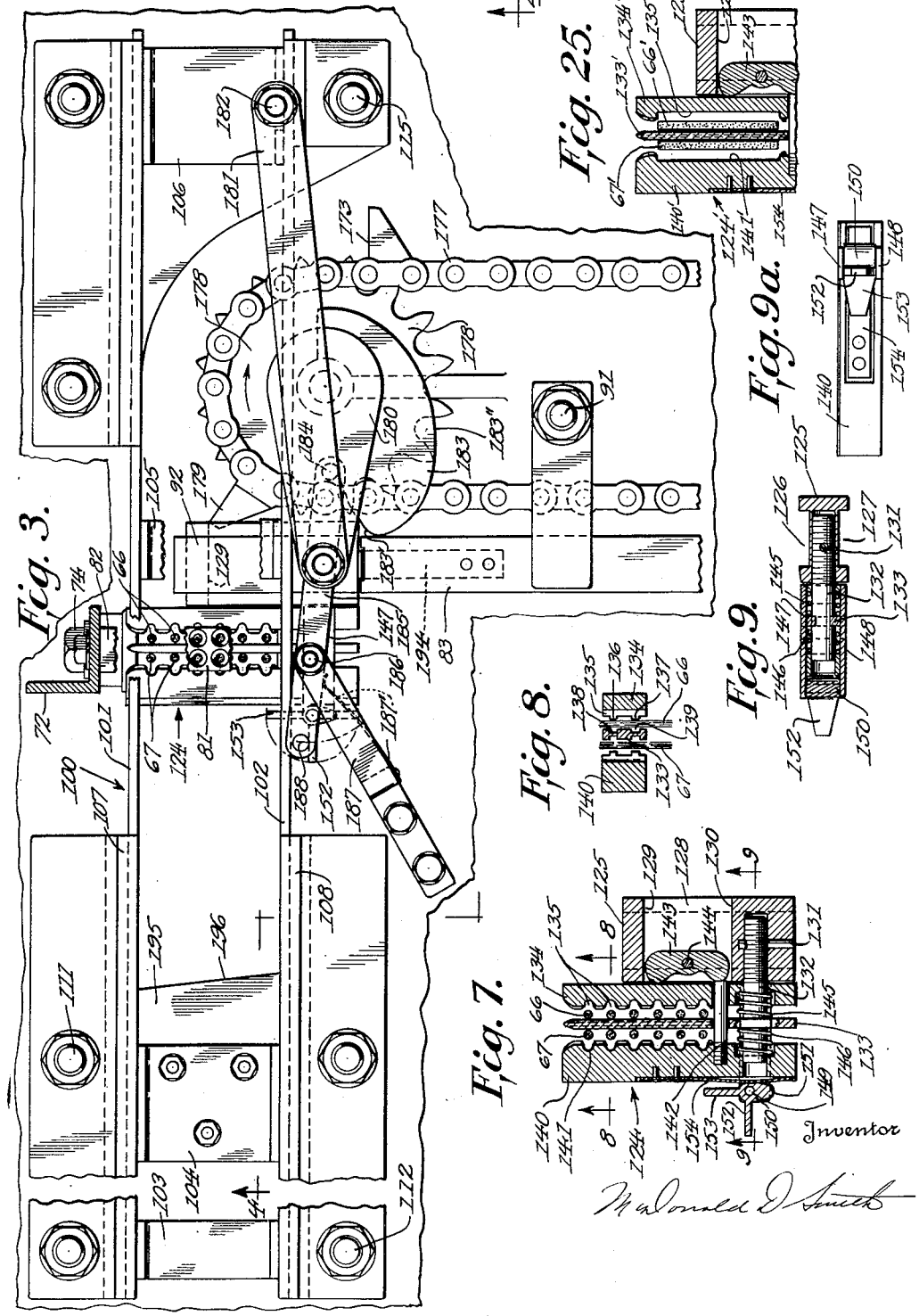

April 17, 1951　　　McDONALD D. SMITH　　　2,549,536
APPARATUS FOR MAKING BRUSHES
Filed April 11, 1946　　　　　　　　　　　　　　7 Sheets-Sheet 3
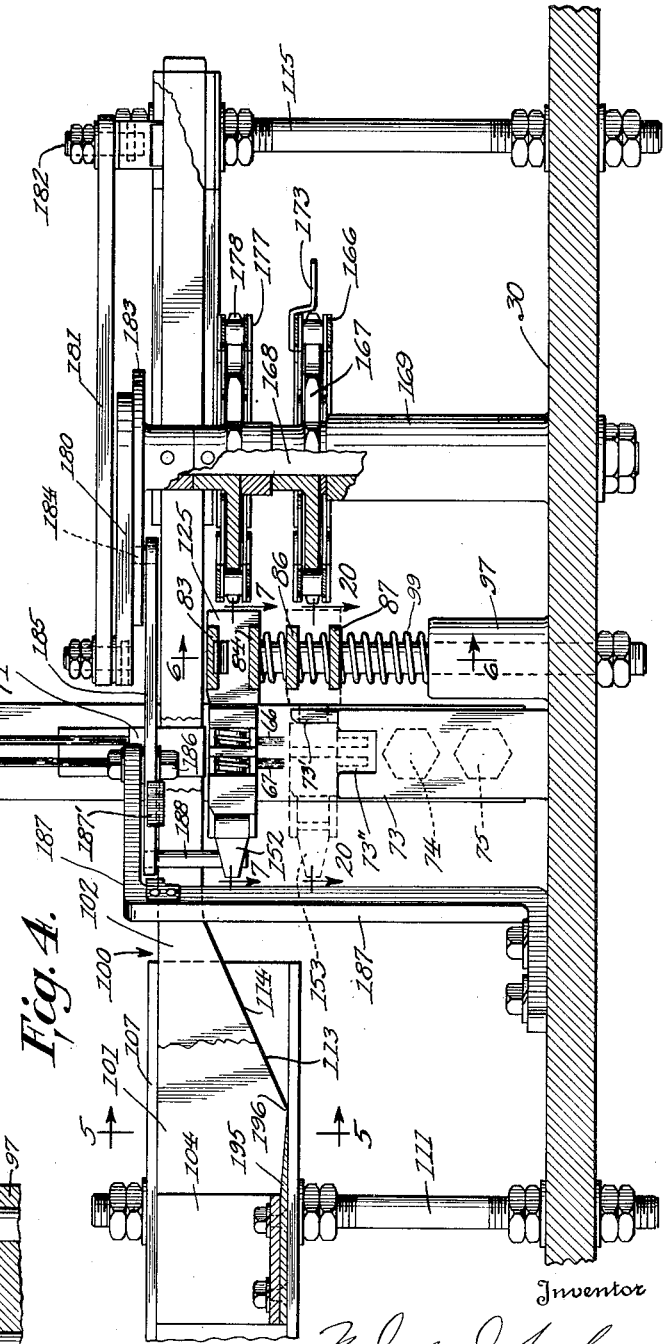

April 17, 1951  McDONALD D. SMITH  2,549,536
APPARATUS FOR MAKING BRUSHES
Filed April 11, 1946  7 Sheets-Sheet 4

Inventor
McDonald D. Smith

April 17, 1951  McDONALD D. SMITH  2,549,536
APPARATUS FOR MAKING BRUSHES
Filed April 11, 1946  7 Sheets-Sheet 6

Inventor
McDonald D. Smith

April 17, 1951 McDONALD D. SMITH 2,549,536
APPARATUS FOR MAKING BRUSHES
Filed April 11, 1946 7 Sheets-Sheet 7

Inventor
McDonald D. Smith

Patented Apr. 17, 1951

2,549,536

UNITED STATES PATENT OFFICE 2,549,536

APPARATUS FOR MAKING BRUSHES

McDonald D. Smith, Washington, D. C.

Application April 11, 1946, Serial No. 661,304

3 Claims. (Cl. 300—2)

The invention relates to an apparatus for the manufacture of brushes. A principal object of the invention is to provide for the rapid production of brushes enabling them to be sold at a very low price so that in the case of toothbrushes, for example, the brush may be discarded after a single use, as it should be. A principal feature enabling the rapid manufacture is the continuous extrusion of a plastic holder, which holder, in the case of toothbrushes, or the like, is severed in lengths to provide handle portions, bristle groups being applied at the proper intervals. A further object of the invention is the rapid production of brushes with a plurality of side-by-side lines of tufts. In the case of toothbrushes another object is to provide a packaged brush having dentifrice applied to the tuft ends.

The invention is shown in illustrative embodiment in the accompanying drawings in which Figure 1 is a plan view of a machine in accordance with the invention.

Figure 2 is a section substantially on line 2—2 of Figure 1.

Figure 3 is an enlarged plan view of the upper left-hand portion of Figure 1.

Figure 4 is a section substantially on line 4—4 of Figure 3.

Figure 5 is a section substantially on line 5—5 of Figure 4.

Figure 6 is a section substantially on line 6—6 of Figure 4.

Figure 7 is a section substantially on line 7—7 of Figure 4.

Figure 8 is a section substantially on line 8—8 of Figure 7.

Figure 9 is a section substantially on line 9—9 of Figure 7.

Figure 9a is an elevation of the apparatus of Figure 7 as seen from the left of that figure.

Figure 21 is an isometric view of a brush produced by the apparatus of the preceding Figures.

Figure 22 is a section on line 22—22 of Figure 21.

Figure 24 is a section of cement applying means usable in place of certain means shown in Figures 1 and 2.

Figure 25 is a section like that of Figure 7 showing a modification.

Figure 10:
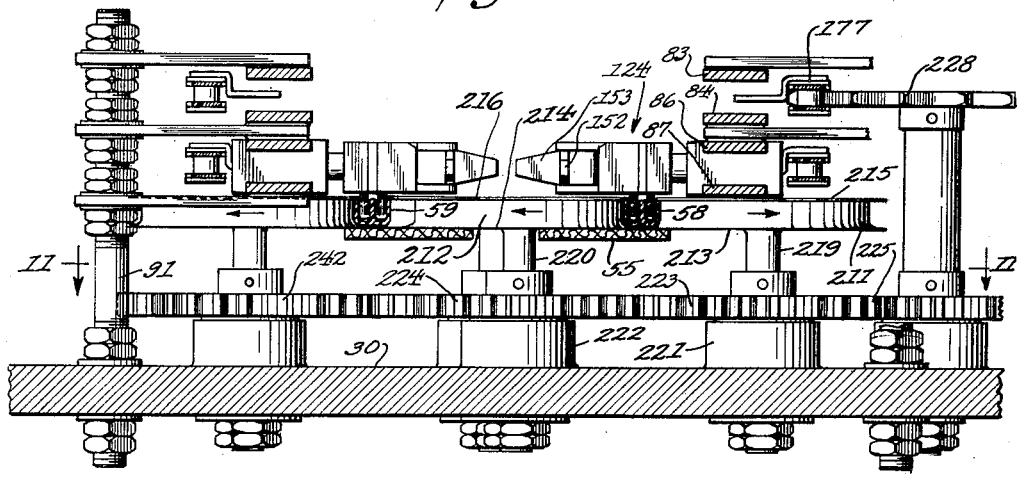
Figure 10 is a section substantially on line 10—10 of Figure 1.

Referring to Figures 1 and 2, reference numeral 30 designates generally an elongated plate or table top which is spread at its left-hand end to provide wings 31 and 32 of which the latter is broken away in Figure 1. The left-hand end of the plate is supported on two vertically adjustable legs of which one appears at 33 in Figure 2, the lower extremity of the leg being equipped with a caster 34 whose axis extends transversely of the table. The leg 33 is secured to the plate through a flanged fitting 35 and a similar leg and fitting are associated in symmetrical relation with the wing 32. The right-hand end of the plate is supported on a single caster 36 journaled in a leg 37 extending downwardly from the center of a U-shaped member whose arms are secured in flanged fittings 38 and 39. The plate thus is universally adjustable at its left-hand end with respect to an extruder 40 whose head is shown at 41, and is movable toward and away from the latter and lockable in adjusted position.

Figure 15:
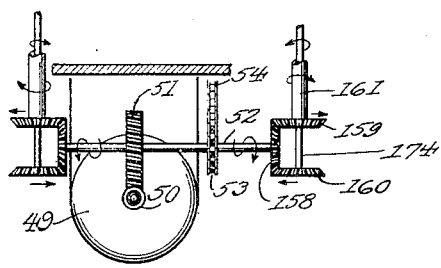
Figure 15 is a section substantially on line 14—14 of Figure 1 but extending the full width of the machine.

At its forward or left-hand end plate 30 is centrally slotted at 42 for the accommodation of a pair of similar pulleys of which one appears at 43 in Figure 2, the pulleys being mounted on a shaft 44 journaled in brackets secured beneath the plate at the sides of the slot. At its foot or right-hand end the plate has a central slot 45 accommodating a pair of similar pulleys of which one appears at 46, Figure 2, these pulleys being fixed on a shaft 47 journaled in brackets secured beneath the plate, the shaft having fixed thereon between the pulleys a sprocket 48. Secured beneath the plate is an electric motor 49 to the armature shaft of which is fixed a worm 50 engaging a worm wheel 51 fixed on a shaft 52 journaled beneath the plate, see also Figure 15. Fixed on shaft 52 is a sprocket 53 which through a chain 54 drives sprocket 48 and hence the pulleys which are fixed on shaft 47. The latter pulleys drive endless conveyor belts 55 and 56 whose other ends are engaged by the pulleys as at 43, the upper runs of the belts, Figure 2, travelling to the right above the plate. At suitable intervals the upper runs are supported by rollers 57 mounted in brackets secured to the top of the plate.

Figure 14:
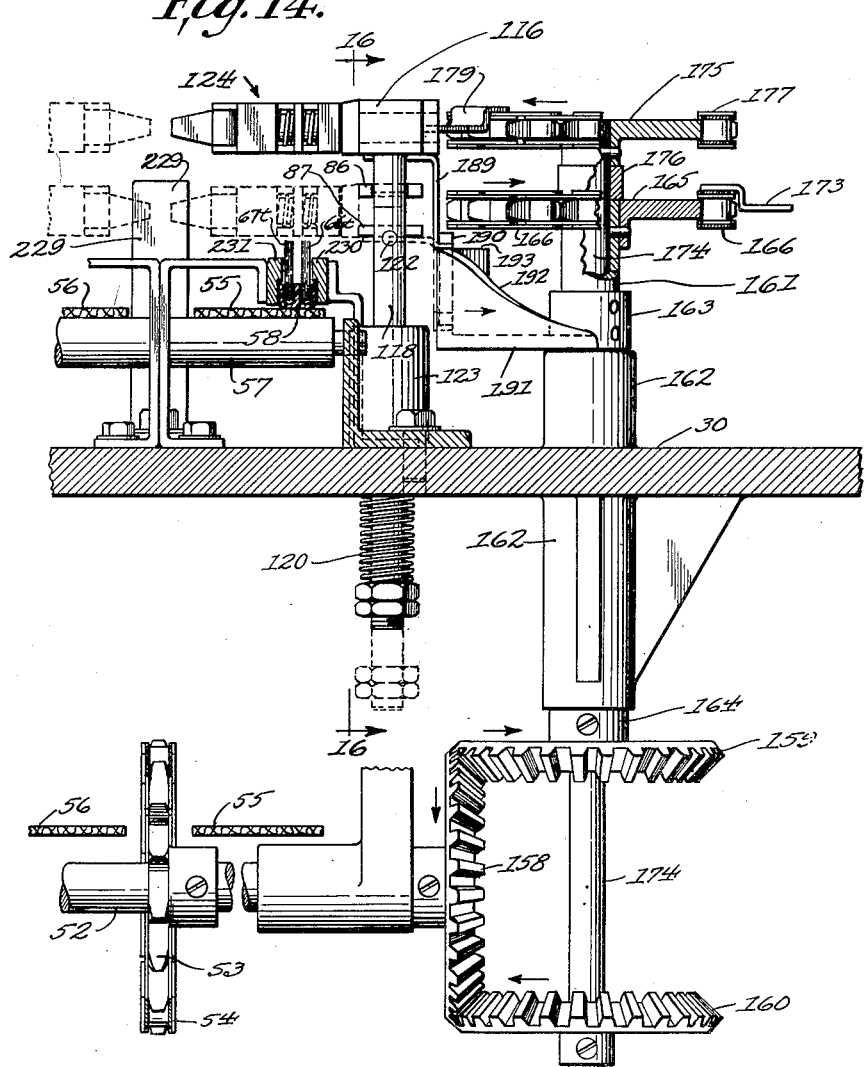
Figure 14 is a section substantially on line 14—14 of Figure 1.

The top runs of belts 55 and 56 are positioned in receiving relation to channel strips 58 and 59 extruded from head 41, these channels being of W-section and upright as shown in Figures 10, 14 and 21. The speed of the belts is ordinarily substantially equal to the speed of extrusion. However, depending on the requirements of the plastic, etc., the speed of the belts may be greater or less or equal to the speed of the extrusion. The extruded channels are carried rectilinearly along the table on the belt tops.

By providing the two belts in association with two extrusion orifices of the same head, production is doubled. However, the invention is exemplified in the provision of a single belt and orifice and the details of the apparatus will be described with reference to the upper half of Figure 1, it being understood that the lower half is substantially a duplicate.

With the channel 58 being fed as above described it next becomes necessary under the invention to insert therein, at the required intervals, series of bristle tufts. In accordance with preferred practice these tufts, instead of being pre-cut to length, are severed from strands, each comprising a pre-determined number of filaments wound on a reel or reels.

In Figure 2 a pair of parallel horizontal bars as at 60 is supported by uprights as at 61 rising from the table top. The bars are notched on top to receive shafts 62 and 63 which support reels 64 and 65. The reel 64 in this instance has wound thereon six strands, each strand being composed of a desired number of filaments, for example thirty, one of these strands being shown at 66 in Figures 2, 3, 4, 7 and 8. Reel 65 is similarly wound and the strands are shown at 67 in the same figures. The unwinding sides of the reels are adjacent and the strands are led downwardly through vertical openings in guides 68, 69, 70 and 71, the guides extending horizontally from a vertical angle 72 which is secured to one side of a vertical channel 73 fixed on top of plate 30. In the present instance the angle 72 is secured to channel 73 through bolts 74 and 75, indicated in Figures 3 and 4, so that the angle, together with the guides, is readily demountable and replaceable.

The guide 68 is a block having two parallel rows of vertical bores countersunk at the top as indicated in Figure 4, the bores being of a diameter to confine the strands and give thereto, or maintain, a substantially cylindrical form without substantial binding.

Figure 18:
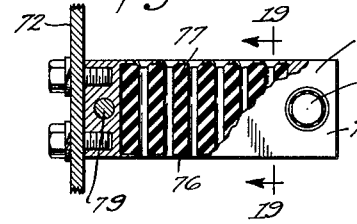
Figure 18 is an elevation partly broken away of a further guide member which appears in Figure 2.
Figure 19:
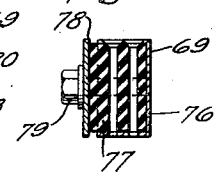
Figure 19 is a section substantially on line 19—19 of Figure 18.
Figure 20:
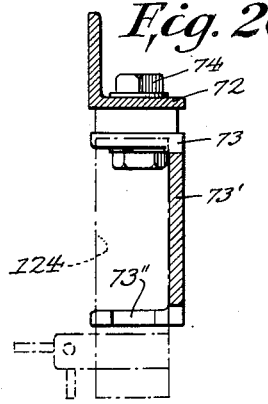
Figure 20 is a section substantially on line 20—20 of Figure 4.

The guide 69 is shown in Figures 18 and 19 and comprises a laterally open box 76 receiving a block 77 of rubber, or the like, provided with vertical bores countersunk at the top and substantially aligned with the bores of the block 68. In Figures 18 and 19 reference numeral 78 designates a plate secured to the box 76 through bolts 79 and 80, and by adjusting the bolts and thereby compressing the block a desired friction may be applied to the formed strands passing through the block openings.

The guide 70 may be like guide 68 in all respects. The guide 71, as particularly shown in Figure 17, comprises a horizontal block portion 81 downwardly offset from a bracket portion 82, the block portion being provided with countersunk bores substantially aligned with the bores of the guides thereabove.

In practice the post 72 and the guides are preferably removed and the strands threaded through the guides so that the assembly is quickly mountable in replacement of duplicate guide structure upon the exhaustion of the reels associated therewith. With the apparatus ready for operation, the lower extremities of the strands 66 and 67 project to a certain extent below the guide 71 as shown in Figure 4.

Reference numerals 83 and 84 designate upper and lower rails defining a track extending from just below and to the far side, Figure 1, of the guide 71 in angular relation toward the conveyor belt 55, the rails being horizontally bent at 85 and then extending in parallel relation alongside the belt. Similar parallel rails 86 and 87 define a track extending directly below the track defined by the upper rails 83 and 84. The rails are supported by means of arms as at 88, 89, and 90, Figure 6, apertured to receive the upper threaded ends of posts, as at 91, extending upwardly from the table. The arms at 88 support the strip 83 and are clamped between nuts threaded on the posts. The arms as at 89 support the strips 84 and 86 and are engaged between nuts threaded on the posts. The similarly clamped arms, as at 90, support the lower rail 87.

In Figure 6 reference numeral 92 designates a U-shaped transfer member supported on vertical rods 93 and 94 with its arms 95 and 96 in parallel horizontal relation and spaced apart the same distance as the rails of the tracks. Rods 93 and 94 are slidable in a block 97 fixed on the table top and extend downwardly through the table top and have stop nuts threaded on their lower ends. Compression springs 98 and 99 surround the rods and are interposed between the transfer member and block 97 and normally yieldingly hold the transfer member in the dotted line position shown in Figure 6, wherein the arms 95 and 96 are aligned with rails 83 and 84, this disposition being determined by the stop nuts. The transfer member extends alongside the downwardly projecting ends of strands 66 in parallel spaced relation thereto on the side thereof opposite strands 67.

Figure 17:
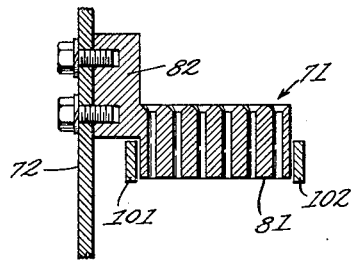
Figure 17 is a vertical section of a guide member which appears in Figures 3 and 4.

Reference numeral 100 designates a slide comprising parallel horizontal elongated strips 101 and 102 disposed in vertical planes and connected at intervals by means of U-shaped members 103, 104, 105 and 106, Figure 3, the strips straddling the block portion of guide 71 as shown in Figure 17. At their left-hand ends, Figure 4, strips 101 and 102 are relatively deep and are guided in channels 107 and 108 fixed back-to-back against channels 109 and 110 secured to the table top through posts 111 and 112, the latter channels being vertically adjustable on the posts through positioning nuts as particularly shown in Figure 4. The deep portions of the strips incline at 113 and 114, Figure 4, into narrow portions which, as shown in Figure 17, straddle the block portion 81 of guide 71 with slight clearance.

These narrow portions are guided in channels similar to the channels 107 and 108 supported for vertical adjustment on posts as at 115 rising from the table top. By means to be hereinafter described the slide 100 is displaceable to the right from the position of Figure 4 with the result that the transfer member 92, through the action of inclines 113 and 114, is lowered from the dotted line position, Figure 6, to the full line position wherein its arms 95 and 96 are in alignment with rails 85 and 87 respectively.

At the foot ends of the tracks a transfer member 116, similar to the member 92, is supported on vertically slidable rods 117 and 118, normally urged downwardly by compression springs 119 and 120 beneath plate 30. Normally stop pins 121 and 122 set in rods 117 and 118 engage the top of a block 123, similar to block 97, so that the transfer member is in the dotted line position of Figure 16 wherein its arms are in alignment with rails 86 and 87 respectively. By means to be hereinafter described, the transfer member 116 is liftable to the full line position of Figure 16 wherein its arms are in alignment with the upper rails 83 and 84.

Reference numeral 124 generally designates a carrier or traveler slidable along the tracks and transferable by the transfer members 92 and 116 from the top track to the bottom track at the head end of the machine and from the bottom track to the top track at the foot end of the machine. The carrier comprises a block 125 which as particularly shown in Figure 9 has top and bottom grooves 126 and 127 shown in Figure 4, full line position, as having engaged therein the rails 83 and 84. The block is provided with a horizontal transverse aperture 128 bounded by parallel end walls 129 and 130, Figure 7.

Threaded in a horizontal transverse bore of block 125 and locked by a pin 131 is a stud 132 to which is rigidly fixed a plate or tongue 133 extending parallel to the side of the block in spaced relation thereto. Disposed between the plate and the block and extending lengthwise thereof is a jaw 134 slidable on stud 132. The jaw has six generally semi-circular vertically extending grooves 135 faced toward plate 133, the lands between the grooves being provided with transversely extending ribs 136 and 137 adapted to be received in grooves 138 and 139 in the plate. Slidable on stud 132 on the opposite side of plate 133 is a jaw member 140 provided with grooves 141 opposed to grooves 135, the lands between the grooves having transverse ribs receivable in grooves of plate 133 opposite grooves 138 and 139. A stud 142 threaded in jaw 140 extends with close sliding clearance through apertures in plate 133 and jaw 134 and prevents swinging of the jaws about stud 132. The right-hand end of stud 142, Figure 7, bears against one end of an equal-armed lever 143 pivoted in recess 128 on a vertical pin 144, the other end of the lever bearing against the side of jaw 134. Compression springs 145 and 146 surrounds stud 132 and are interposed between plate 133 and the bottoms of recesses in jaws 134 and 140, respectively.

Straps 147 and 148 are set flushly in grooves extending parallel to and on opposite sides of stud 132 in the jaws and plate 133, the straps being fixed to jaw 134 and extending outwardly beyond jaw 140 to support a pivot pin 149 on which is pivoted a dog 150 which includes a nose 151 and rectangularly related arms 152 and 153 of which the latter projects oppositely from the nose 151. The dog bears against an outwardly bowed leaf spring 154 secured to the outer side of jaw 140. In the normal relation of parts shown in Figure 7 the springs 145 and 146 urge jaw 134 against block 125 and jaw 140 against dog 150 so that the jaws are substantially equally spaced from plate 133. If the dog is swung counter-clockwise, Figure 7, jaw 140 will be forced toward and against plate 133, and through stud 142 and lever 143, jaw 134 will be similarly forced toward and against the opposite side of plate 133. The nose of the dog is flattened so that when it is swung counter-clockwise 90° from the position of Figure 7, it will retain that position and hence, the clamped relation of the jaws, this relation being resiliently assumed and maintained through spring 154. Arm 153 now occupies the position previously occupied by arm 152.

As previously stated, the carrier 124 is slidable along the top and bottom tracks and into and out of the transfer members. The width of the rectilinear portions of the tracks is only slightly less than the width of the grooves 126 and 127 so that the carrier is guided on the rectilinear portions of the tracks without wobble. At the bend 85 in the two tracks the rails are narrowed somewhat to prevent binding. Referring to Figure 2, both tracks dip downwardly at 155 and then follow depressed rectilinear horizontal paths at 156 to a rise 157 which returns them to their original level. The track rails are thinned vertically at the bends to prevent binding. The means for propelling the carrier 124, of which there are several, will now be described.

Shaft 52 has fixed thereon a bevel gear 158 which engages bevel gears 159 and 160 of which the former is fixed on a sleeve 161 journaled in a vertical bearing 162 extending above and below the plate 30, positioning collars 163 and 164 being fixed to the sleeve above and below the bearing. Fixed on the sleeve in a plane midway between the rails 86 and 87 of the lower track is a sprocket 165 which engages a chain 166 having a run extending in substantially parallel relation and adjacent to the track and engaged at its other end by a sprocket 167, Figure 4, freely rotating on a shaft 168 journaled in a bearing 169 which extends upwardly from plate 30 at the head end of the tracks. The chain is guided in a general way along the track bend 85 by idler sprockets 170 and 171 journaled on studs projecting upwardly from the plate, while the outer run of the chain is guided by a grooved wheel 172 also mounted on an upwardly projecting stud. At intervals, chain 166 has outwardly projecting fingers 173 secured thereto, the fingers having leading edges perpendicular to the line of the chain. The inner run of the chain travels to the right, Figure 1.

Gear 160 is fixed on a shaft 174 journaled in sleeve 161 and having fixed to its upper end a sprocket 175 opposite the upper track and spaced from sprocket 165 by a spacer 176. Sprocket 175 engages a chain 177 similarly guided to and extending directly above chain 166 and engaging a sprocket 178 fixed to shaft 168. Fixed on chain 177 and projecting outwardly thereof are fingers 179 whose leading edges are perpendicular to the line of the chain, the chain travelling oppositely to chain 166. In Figure 1 the intermediate portions of the runs of chain 177 are broken away to reveal the lower chain.

Fixed on the upper end of shaft 168, Figures 1 and 4, is an arm 180 to the outer end of which is pivoted one end of a link 181 whose other end is pivoted to a stud 182 on slide 100. Fixed to shaft 168 beneath arm 180 is a cam 183 which cooperates with a follower 182 carried by a lever 185 pivoted on a vertical bolt 186 mounted in a horizontal portion of a bracket 187 which rises from the base plate. The lever is continued beyond its pivot point and has secured to its continued portion a downwardly projecting pin 188 for cooperation with the arm 152 of dog 150 for the purpose of swinging the dog to its jaw-closing position.

Fixed to the underside of the transfer member 116 is a bracket 189 which projects downwardly and carries at its lower extremity a follower 190 cooperative with a cam 191 which is carried by the collar 103, Figure 14. Cam 191 has a rise 192 and an upper dwell 193.

To explain the operation of the apparatus thus far described, each finger 179 on the inner run of the top chain 177 is in driving engagement with the wall 129 of the recess 128 of a carrier 124 so that a series of carriers is being propelled to the left along the top track, Figures 1 and 2. The carriers are successively driven into the transfer member 92, the latter being in its upper position shown in dotted lines, Figure 6. The jaws of the carrier are open and the exposed ends of the filament strands or groups below guide 71 are freely received between the jaws and plate 133 in lateral register with the grooves 135 and 141. This is assumed to be the starting position of the carrier. A spring detent 194 secured in a groove in the underside of rail 83 prevents any rebound of the carrier from the transfer member. At this point the propelling finger 179 passes away from wall 129, as shown in Figure 3. An abrupt rise 183' of cam 183 now acts on the follower 184 to swing lever 185 counter-clockwise, Figure 3, so that pin 188 engages arm 152 of dog 150 and the latter is swung to close the jaws on the downwardly projecting ends of strands 66 and 67 so that the latter are engaged in the jaw grooves and are clamped against plate 133 with their cylindrical form substantially maintained. Detent 194 holds the carrier against movement by pin 188 as it swings the dog. After the jaws are thus locked follower 184 comes opposite a descending curve 183'' of cam 183 against which it is forced by a spring 187' on bracket 187.

During this clamping operation slide 100 was being driven to the right, Figure 3, through crank 180 and link 181 and, clamping having been completed, the inclines 113 and 114 of plates 101 and 102 engage the adjacent top edge of carrier 124 and the latter, together with the transfer member 92, is cammed downwardly to the full line position of Figure 6, or dotted line position of Figure 4, wherein the carrier is borne lightly against the top of the upright channel 73 and rests lightly against an upwardly projecting tongue 73' of the channel. Fixed to the bottom of the cross member 104 of slide 100, Figures 3 and 4, is a horizontal knife 195 having a biased cutting edge 196 at the lower end of the inclines 113 and 114. As the carrier 124 comes into its lower position the knife 195 is slid across the top of the carrier to sever the strands 66 and 67, and form tufts 66t and 67t, Figures 10, 14, 20 and 21, the forward thrust of the knife being taken by the tongue 73' and the carrier being sustained by the top of channel 73 for a clean shearing action of the knife along the flat top of the carrier.

While the carrier is being held in its lower position by the lower edges of strips 101 and 102, a finger 173 of the bottom chain 166 enters the recess 128 of the carrier and engages wall 130 thereof so that the carrier is moved from the transfer member between rails 86 and 87 of the lower track so as to be substantially engaged therebetween before being released by the slide 100 in its return to the position of Figures 3 and 4. As soon as the carrier block is completely between rails 86 and 87 the transfer member 92 is returned to its upper position by springs 98 and 99. The far flange of channel 73 is provided with a top cutout 73'' which provides clearance for the downwardly projecting tuft ends as the carrier is moved from the transfer member into the lower track.

It will be evident that as the carrier was moved by the slide from its upper to its lower position, it pulled strands 66 and 67 downwardly through the several guides in position to be seized in the same manner by the next carrier with a predetermined length projecting below the latter. Overfeed or backlash is prevented by the friction guide member 69 and also by friction screws as at 197, Figure 2, bearing against the reel flanges, if desired. After the transfer member reaches its upper position the next carrier, with its jaws open, is inserted therein.

Figure 23:
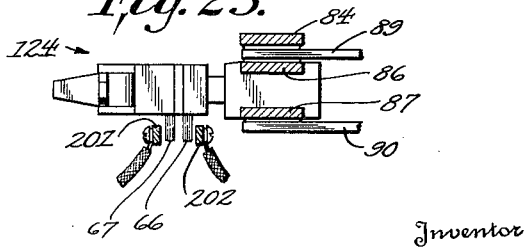
Figure 23 is a partial section like that of Figure 4 showing an alternative structure.

In order that the filaments of each severed tuft held by the carrier may be securely united, various means may be provided. Assuming that fusible filaments of a suitable plastic are being used, their downwardly projecting ends or butts may be carried along the flame of, for example, a gas burner 198 fed from a pipe 199 through a valve 200. Or, referring to Figure 23, the lower projecting ends, or butts, may be fused together by high frequency current applied through electrodes 201 and 202 extending a suitable distance along the path of travel of the tuft extremities. Otherwise, there may be substituted for the heating means a pad 203, Figure 24, mounted at the top of a receptacle 204 on a perforated plate 205 and wicking a suitable cement 206, the lower extremities of the tufts lightly wiping the top of the pad, as indicated. Flame heating is utilizable where the plastic bristle material is not quick burning, for example, in the case of "nylon."

The tuft extremities are thus solidly united so that the individual bristles cannot pull out in use.

Reference numeral 207 designates an applicator fed from a tank 208, Figures 1 and 2, and adapted to supply a cement to the lower extremities and preferably, also the lower outer margins of the tuft groups being transported by the carrier.

When the carrier has passed the bend 85 the parallel groups of tufts being transported thereby are directly above the channels of the extruded strip 58 which is moving with the belt 55 at the same speed as the carrier. Previous to this juncture a suitable cement may be fed into the channel strip by means of a supply nozzle 209 fed from a tank 210 supported above the table as particularly shown in Figure 2.

As the carrier comes into the track decline 155 the bottom ends of the tuft rows are lowered into the channels of the plastic strip and this relation is maintained through the distance 156, Figures 1 and 2.

Figures 12, 13:
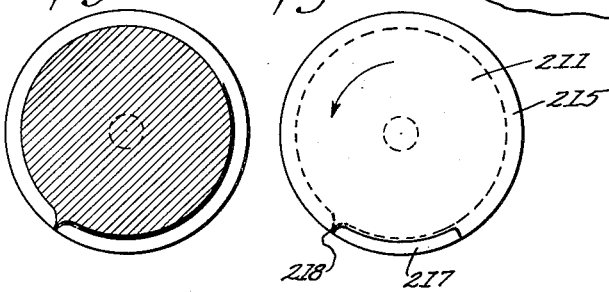
Figure 12 is a plan view of a clipping wheel which appears in Figure 10.
Figure 13 is a trans-axial section of the wheel of Figure 12.

While this relationship continues, the channel strip 58 passes between flanged cutter wheels 211 and 212, Figures 1, 2, 10, 12 and 13, whose lower tapered flanges 213 and 214 are substantially in contact so as to slightly lift the assembly as particularly shown in Figure 10 with the top flanges 215 and 216 also substantially in contact so as to engage over the upper outer edges of the channel while a somewhat compressive action is exerted on the latter by the core portions of the wheels in order to bring the side portions of the channel into firm contact with the embraced ends of the tufts. The cutter wheels 211 and 212 are identical in form and the wheel 211 is shown in Figures 12 and 13. Its top flange 215 has a cut-away portion 217 whose peripheral length is the same as the length of the tuft rows and at the trailing end of the cut-out the wheel has a radially projecting blade 218, the blade having an axially extending knife edge from which it enlarges convexly to its root. The wheel 212 has a similar cut-away portion and knife edge which register with those of wheel 211 and upon each rotation of the wheels the strip is clipped immediately behind a tuft group to produce a brush with a handle 58h as shown in Figures 21 and 22. At this time the strip is in moldable condition and the curved sides of the blades act to smoothly fold or mold the sides of the channels inwardly to the central rib so as to produce a rounded end as indicated at the left of Figure 21.

Wheels 211 and 212 are fixed on shafts 219 and 220 journaled in vertical bearings 221 and 222 on the base plate and the shafts have fixed thereto equal gears 223 and 224 of which the former is engaged by a gear 225 fixed on a shaft 226 mounted in a bracket 227 fixed to the base plate. The upper end of shaft 226 has fixed thereon a sprocket 228 which, as shown in Figure 1, engages the runs of the top chain 177. The diameter of the cutter wheels and their driving ratio is such as to sever the tufted strip immediately behind each tuft group.

Beyond the cutter wheels a post 229 extends upwardly from the base plate in position to engage the arm 153 of the locking dog 150 so that the latter is swung clockwise, permitting the springs 145 and 146 to release jaws 134 and 140. Thereafter the carrier comes into the track rise at 157 and is lifted away from the tufts. Prior to this the leading end of the brush handle entered between horizontal parallel guide strips 230 and 231 having in-turned upper flanges engaging over the channel sides so that the brush is held down against any tendency to lift with the rising carrier.

Figure 16:
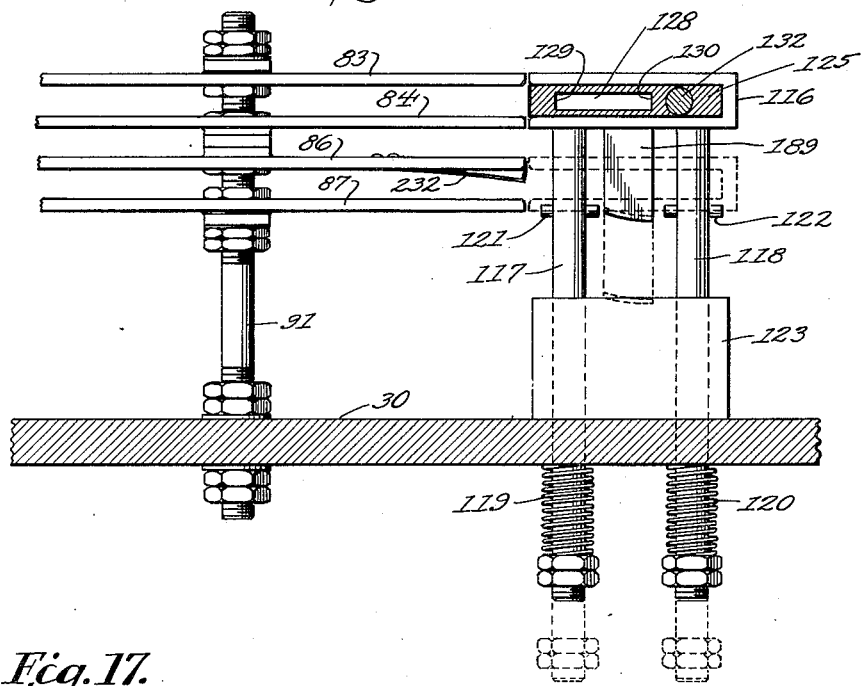
Figure 16 is a section substantially on line 16—16 of Figure 14.

The carrier thus released from the tufts moves into the elevator 116 which is in the lower position shown in dotted lines in Figure 16 and is retained by a spring detent 232 which moves into a groove in the bottom of rail 86 to pass the carrier. Hereupon the rise 192 of cam 191 engages the follower 190 so that the transfer member is elevated to the full line position of Figure 16 and is maintained in this position by the dwell 193 until the carrier has been picked up by a finger 179 of chain 177 and moved into the top track. The transfer member is then lowered into receiving relation to the lower track by springs 119 and 120.

While still guided by the rails 230 and 231 the tuft tips may have applied thereto a dentrifice which may be a paste contained in a reservoir 233 and extruded through a nozzle 234, Figure 2. The brushes then pass off the foot end of the belt 55 into a chute 235 which directs them into a package, or packaging apparatus, 236. The packages should be hermetically sealed.

Any suitable plastic may be used for the handle material and suitable temperature controlling means may be provided as needed along the path of travel. In this connection and in others, my co-pending application, Serial No. 636,313, filed December 21, 1945, now abandoned, may be considered in supplement to the present disclosure. For example, if the plastic tends to cool too much in advance of the clipping wheels I may provide a heating chamber in advance of the wheels so as to condition the channel for easy clipping. The channel is clipped behind the heads since in this way a better closing effect is secured at the head extremity so that the sides of the channel are substantially merged to give a smooth finish.

Ordinarily the bristle filaments are wound flat on the reels and the separate strands are given a substantially cylindrical form in the guides which thus serve also as mandrels. Obviously, instead of a single reel containing a sufficient number of filaments to provide the required number of multi-filament strands, individual reels each wound with a sufficient number of filaments for a single strand may be used. The length of the severed tufts depends on the length necessary to be inserted in the handle plus the thickness of the carrier. Therefore, by using carriers of different thicknesses the lengths of the applied tufts, and hence their stiffness, may be varied.

Figure 11:
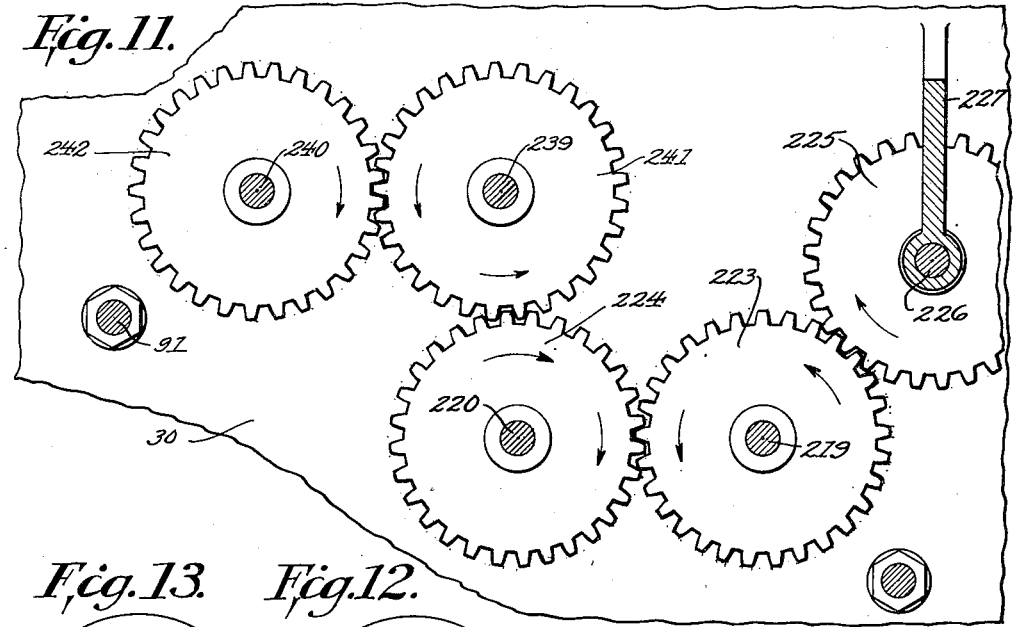
Figure 11 is a section substantially on line 11—11 of Figure 10.
Figure 26:
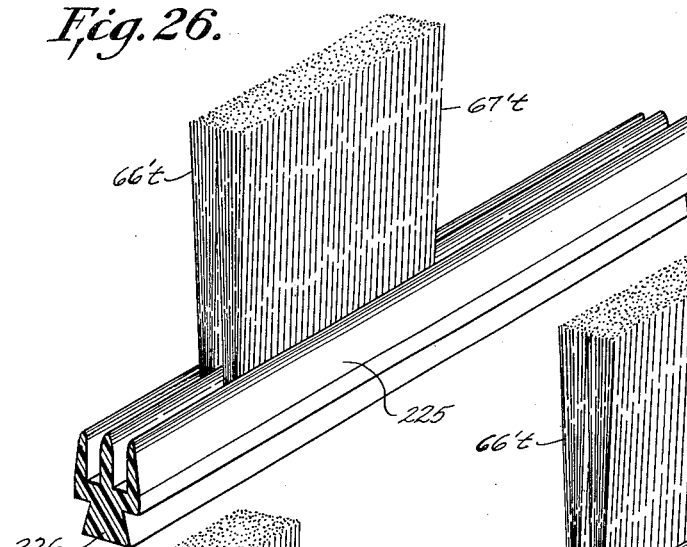
Figure 26 is an isometric view of a brush in process of manufacture.
Figure 27:
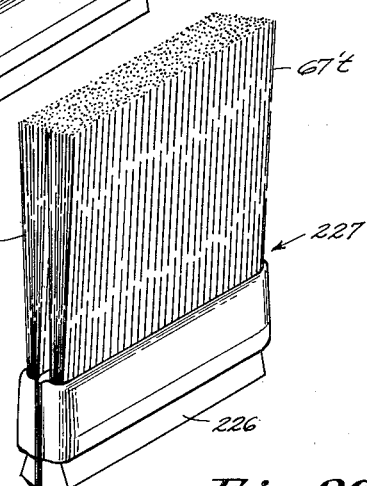
Figure 27 is an isometric view showing a succeeding step.
Figure 28:
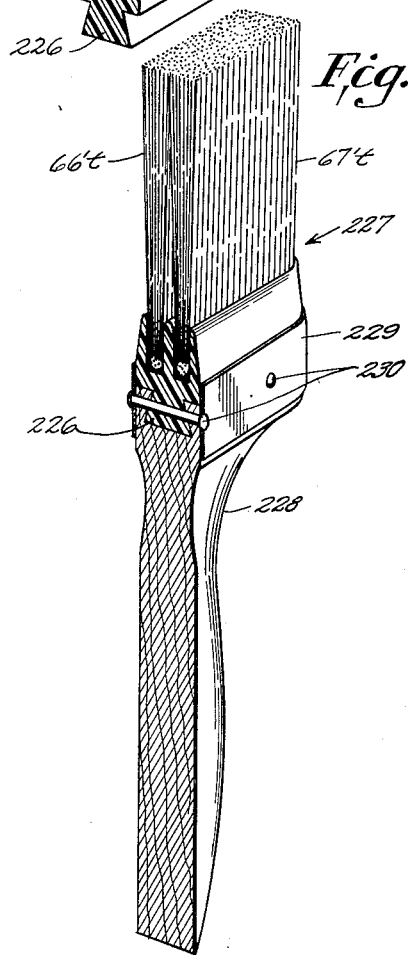
Figure 28 is a longitudinal section of the completed brush.

The side of the machine served by belt 56 is the same as that served by the belt 55. The only difference, as here shown, is that the cutter wheels 237 and 238, Figure 1, are in advance of cutter wheels 211 and 212, being mounted on shafts 239 and 240, Figure 11, which have fixed thereto engaged equal gears 241 and 242 of which the former engages the equal gear 224.

Where small individual tufts are not required, in the case of paint brushes, for example, the filaments are drawn from the reels in the form of wide strands 66' and 67', Figure 22, and the jaws 134' and 140' of carrier 124' are provided with elongated recesses 135' and 141' for the reception and clamping of the strands. The jaws are of such depth that sufficiently long bristle groups or tufts 66't and 67't, Figures 26, 27, and 28, are provided when the strands are clipped along the top of the carrier. The bristle groups or tufts have their lower ends, with the filament ends united as by fusing, set in the channels of a strip 225, Figure 26, in the same manner as previously described, the strip in this instance including a dove-tail rib portion 226. The clipping wheels are designed to clip the strip closely in front of and behind the bristle groups to produce heads as at 227, Figure 27, and the waste portions of the strip between the bristle groups are salvaged as re-usable scrap. In Figure 28 a head 227 is shown as having its rib 226 engaged in a dove-tail groove in a handle 228 with the joint embraced by a band 229 and secured by rivets 230.

Figure 29:
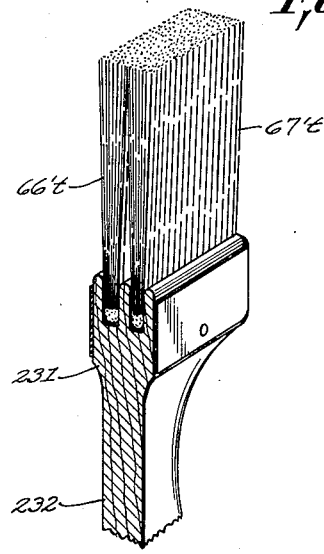
Figure 29 is a section like that of Figure 26 showing a modification.

In Figure 29 the ends of the bristle groups 66't and 67't are directly engaged and adhesively secured in channels in the head or holder portion 231 of a brush handle 232.

Glass filaments may be mentioned as usable in the case of paint brushes and the like.

Procedures, apparatus, and products varied from those herein given as illustrative are contemplated as within the scope of the invention as defined in the claims which follow.

I claim:

1. Apparatus for making brushes, comprising a pair of tracks extending lengthwise of each other, a carrier, means for propelling said carrier in opposite directions along said tracks respectively, transfer members for the carrier at the ends of the tracks respectively into which the propelling means are adapted to propel the carrier, means for timedly reciprocating the transfer members between the tracks, means for loading said carrier with a bristle tuft while it is in one of said transfer members so that an end portion of the tuft projects from the carrier, said carrier being then withdrawn from said one of said transfer members and propelled along one of the tracks by the propelling means whose action is away from said one of said transfer members, means for supplying a holder to said end portion of the tuft while the carrier is thus propelled, and means for releasing the carrier from the tuft, the carrier then entering the other of said transfer members for transfer to the other track and propulsion back to said one of said transfer members.

2. Apparatus for making brushes, comprising a pair of tracks extending lengthwise of each other, a carrier, means for propelling said carrier in opposite directions along said tracks respectively, transfer members for the carrier at the ends of the tracks respectively into which the propelling means are adapted to propel the carrier, means for timedly reciprocating the carrier between said tracks, said carrier having clamping jaws, guide means for presenting a multifilament strand in position to be received between said jaws with a portion projecting therebeyond as the carrier moves into one of said transfer members from one of said tracks, means for closing the jaws, said reciprocating means thereupon acting to move said one of said transfer members into alignment with the other of said tracks whereby said strand is pulled a certain distance, means for severing the strand between said guide means and carrier to provide a tuft with a projecting end, said carrier being then withdrawn from said one of said transfer members and propelled along the other of said tracks by the propelling means whose action is away from said one of said transfer members, means for supplying a holder to the projecting end of the tuft while the carrier is thus propelled, and means for releasing said jaws, the carrier then entering the other of said transfer members for transfer to said one of said tracks.

3. Apparatus for making brushes, comprising means for extruding a channel strip, a conveyor arranged to receive the extruded strip, means for setting groups of bristle tufts in the channel at spaced apart intervals, and clipping means arranged on opposite sides of the path of travel of the tufted strip and having opposed blades arranged to clip the strip immediately behind each tuft group and fold the channel side walls inwardly toward each other.

McDONALD D. SMITH.

REFERENCES CITED

The following references are of record in the file of this patent:

UNITED STATES PATENTS

| Number | Name | Date |
| --- | --- | --- |
| 455,740 | Consene | July 14, 1891 |
| 1,563,367 | Hultquist | Dec. 1, 1925 |
| 1,611,640 | Janus | Dec. 21, 1926 |
| 2,035,709 | Laub | Mar. 31, 1936 |
| 2,299,709 | Cave | Oct. 20, 1942 |
| 2,303,800 | Swann | Dec. 1, 1942 |
| 2,341,823 | Smith | Feb. 15, 1944 |
| 2,400,809 | Cave | May 21, 1946 |